United States Patent
Kim

(10) Patent No.: US 11,038,397 B2
(45) Date of Patent: Jun. 15, 2021

(54) TERMINAL ASSEMBLY FOR DRIVING MOTOR OF VEHICLE

(71) Applicant: HYUNDAI MOBIS Co., Ltd., Seoul (KR)

(72) Inventor: Min Koo Kim, Goyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 173 days.

(21) Appl. No.: 16/554,305

(22) Filed: Aug. 28, 2019

(65) Prior Publication Data

US 2020/0106328 A1    Apr. 2, 2020

(30) Foreign Application Priority Data

Oct. 1, 2018   (KR) .................. 10-2018-0116994

(51) Int. Cl.
    *H02K 5/22*      (2006.01)
    *H02K 3/28*      (2006.01)
(52) U.S. Cl.
    CPC .............. *H02K 5/225* (2013.01); *H02K 3/28* (2013.01); *H02K 2203/09* (2013.01); *H02K 2203/12* (2013.01)
(58) Field of Classification Search
    CPC ...... H02K 2203/09; H02K 5/225; H02K 3/28; H02K 2203/12
    See application file for complete search history.

(56) References Cited

U.S. PATENT DOCUMENTS

| | | | | |
|---|---|---|---|---|
| 8,922,079 B2* | 12/2014 | Egami | ................... | H02K 3/522 310/71 |
| 9,099,896 B2* | 8/2015 | Hofmann | ............... | H02K 3/522 |
| 10,742,003 B2* | 8/2020 | Takahashi | ............. | H02K 21/14 |
| 10,855,130 B2* | 12/2020 | Kim | ......................... | H02K 3/28 |
| 10,903,711 B2* | 1/2021 | Ogawa | ................ | H02K 5/1732 |
| 2011/0001388 A1* | 1/2011 | Fujii | ...................... | H02K 3/522 310/257 |
| 2012/0223604 A1* | 9/2012 | Hennecke | ............. | H02K 11/33 310/71 |
| 2015/0357878 A1* | 12/2015 | Fukunaga | ............... | H02K 5/16 310/71 |
| 2016/0190887 A1* | 6/2016 | Sambuichi | .............. | H02K 3/38 310/71 |

(Continued)

FOREIGN PATENT DOCUMENTS

KR  10-2016-0123143 A  10/2016

*Primary Examiner* — Robert W Horn
(74) *Attorney, Agent, or Firm* — Knobbe Martens Olson & Bear LLP

(57) ABSTRACT

The present disclosure relates to a terminal assembly for a driving motor, which is provided in a driving motor including a core bobbin assembly, to which a core around which a coil is wound in a circumferential direction is mounted, a support ring which supports an outside of the core bobbin assembly, and a terminal assembly coupled to an upper portion of the support ring to fix a coupling terminal. The terminal assembly for a driving motor has a body formed in a circular shape in a plan view and formed in a stepped shape in a side sectional view. The body includes a bus bar fixing part, which is formed on an outer side thereof and allows a bus bar to be fixed thereto, and a terminal guiding part which is formed on an inner side thereof and partitions and guides terminals of the bus bar.

6 Claims, 4 Drawing Sheets

(56) References Cited

U.S. PATENT DOCUMENTS

| | | |
|---|---|---|
| 2018/0123414 A1 | 5/2018 | Kim |
| 2018/0309340 A1* | 10/2018 | Ogawa ............... H02K 11/0094 |
| 2020/0014268 A1* | 1/2020 | Hotta ....................... H02K 3/38 |
| 2020/0014273 A1* | 1/2020 | Ogawa ................. H02K 5/1732 |
| 2020/0059124 A1* | 2/2020 | Yamashita ............. H02K 3/522 |
| 2020/0059126 A1* | 2/2020 | Takahashi ............. H02K 3/522 |
| 2020/0059127 A1* | 2/2020 | Yamashita ............. H02K 3/522 |
| 2020/0106328 A1* | 4/2020 | Kim ........................ H02K 3/28 |

* cited by examiner

TERMINAL ASSEMBLY FOR DRIVING MOTOR OF VEHICLE

CROSS-REFERENCE TO RELATED APPLICATION

This application claims priority to Korean Patent Application No. 10-2018-0116994, filed on Oct. 1, 2018, the disclosure of which is incorporated herein by reference in its entirety.

BACKGROUND

1. Field of the Invention

The present disclosure relates to a terminal assembly for a driving motor, and more particularly, to a terminal assembly for a driving motor which is capable of avoiding creeping discharge and improving cooling efficiency.

2. Discussion of the Background

Generally, a stator winding of a driving motor for hybrid equipment (hybrid cars) constitutes a circuit through a terminal assembly.

In addition, a stator of the driving motor for the hybrid equipment has a concentrated winding structure and forms a three-phase circuit through the terminal assembly in order to bind coils of the concentric winding structure.

A process for fastening the stator-terminal assembly for constituting the three-phase circuit will be described as follows.

First, after winding a wire around a core bobbin assembly, a coil drawing-in/out and forming (a process for positioning the coil on a terminal assembly fusing section) is performed. Twenty-four core bobbin assemblies, the coil already being wound around each of the core bobbin assemblies, are then arranged in a circular shape. Thereafter, the core bobbin assemblies are press-fitted using a support ring.

In addition, the terminal assembly is assembled to the support ring and the twenty-four core bobbin assemblies. Then, the formed coil and a hook portion of the terminal are fused to form the three-phase circuit. The fused hook portion is then entirely coated with an epoxy resin.

On the other hand, in a terminal configuration of a hairpin motor, the terminal assembly is provided with bus bars connected to coil of each phase (U, V, W, and N). These bus bars are fixed to an injection molded body by an insert injection molding process or an overmolding process after insertion so as to achieve insulation between the phases.

In this case, a partition is installed in a base injection molded body due to a concern of creeping discharge (discharge occurring along a surface of an insulator) between the phases to secure a creeping distance (the shortest distance of the surface of the insulator between two electrodes).

Here, although the creepage distance may be increased by the partition, if a height of the partition is increased, a size in an axial direction of the motor is increased so that an overmolding process is required to block the creeping distance.

However, there is a problem that, if a bubble defect occurs during the overmolding process, a dielectric breakdown may occur in the motor due to the creeping discharge.

In addition, in the case where phase lead wires are disposed adjacent to each other in a hairpin motor, there is a risk of discharge since a creeping distance is insufficient even if the overmolding process is performed.

SUMMARY

The present disclosure is proposed to providing a terminal assembly for a driving motor which may not use an overmolding process, may minimize a distance between bus bars, may simultaneously avoid a creeping distance, and may minimize a partition, which obstructs cooling of a coil, so as to enhance cooling efficiency of a motor.

A terminal assembly according to one embodiment of the present disclosure is provided in a driving motor including a core bobbin assembly, to which a core around which a coil is wound in a circumferential direction is mounted, and a support ring configured to support an outside of the core bobbin assembly, and is coupled to an upper portion of the support ring to fix a coupling terminal. The terminal assembly may have a body formed in a circular shape in a plan view and formed in a stepped shape in a side sectional view. The body may include a bus bar fixing part, which is formed on an outer side thereof and allows a bus bar to be fixed thereto, and a terminal guiding part which is formed on an inner side thereof and partitions and guides terminals of the bus bars.

The bus bar fixing part may have an inner bus bar inserting groove and an outer bus bar inserting groove formed in an inner portion and an outer portion thereof, respectively. Insertion directions of the inner bus bar inserting groove and the outer bus bar inserting groove may be formed to be opposite to each other.

The bus bar may be coupled to the inner bus bar inserting groove from top in a downward direction, and the bus bar may be coupled to the outer bus bar inserting groove from bottom in an upward direction.

A terminal guiding part may be formed in a middle of the outer bus bar inserting groove in a vertical direction.

The terminal guiding part may include a terminal fixing section configured to support the terminal of the bus bar and a terminal receiving section formed at an upper side of the terminal fixing section.

The terminal receiving section may enclose an inner surface and both side surfaces of the terminal.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The advantages and features of the present disclosure and the method for achieving them will become more apparent with reference to exemplary embodiments described in detail below together with the accompanying drawings. However, the present disclosure should not be limited to the embodiments disclosed below but may be embodied in many different forms, and these embodiments are provided so that this disclosure will be thorough and complete and will fully convey the scope of the disclosure to those skilled in the art, and the present disclosure is defined by the claims. Meanwhile, the terminologies used herein are for the purpose of describing particular embodiments only and are not intended to be limiting to the disclosure. As used herein, the singular forms are intended to include the plural forms as well, unless the context clearly indicates otherwise. In addition, the term "comprise" or "comprising" used herein does not preclude the presence or addition of one or more other components, steps, operations and/or elements besides the stated component, step, operation and/or element.

Figure 2:
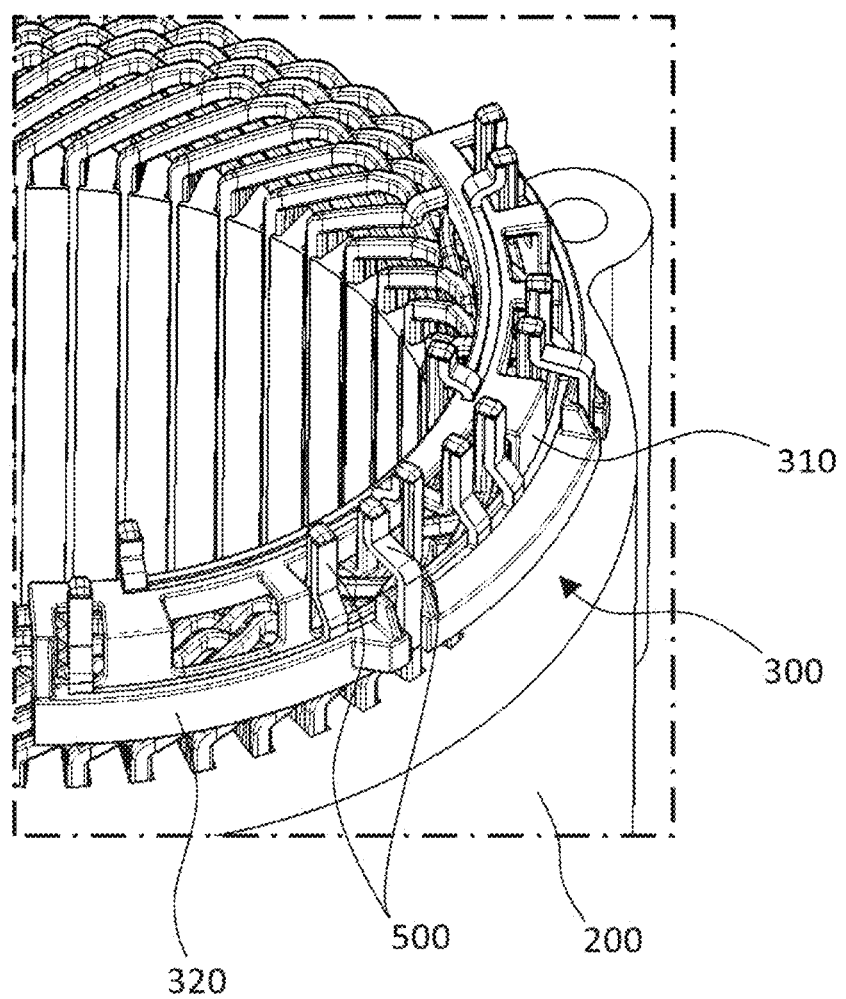
FIG. 2 is a partially enlarged perspective view showing a terminal assembly for a driving motor according to an embodiment of the present disclosure.
Figure 3:
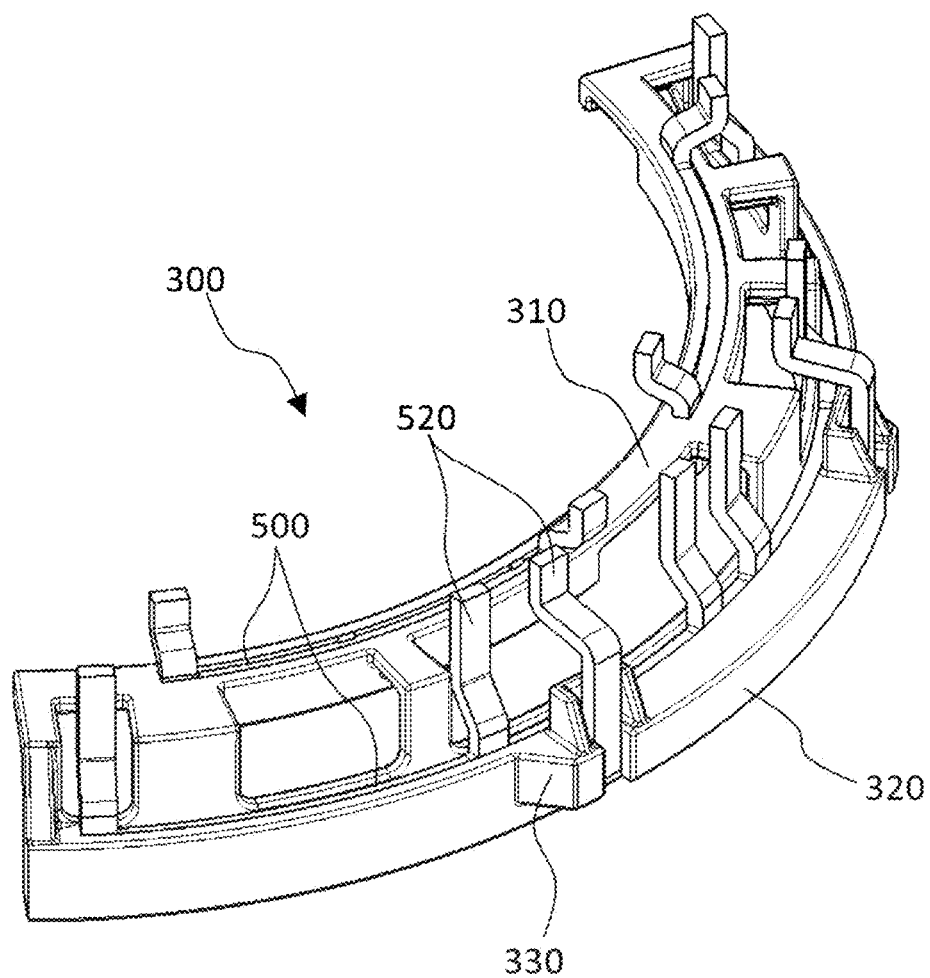
FIG. 3 is an enlarged perspective view showing main parts of the terminal assembly for the driving motor according to the present disclosure.
Figure 4:
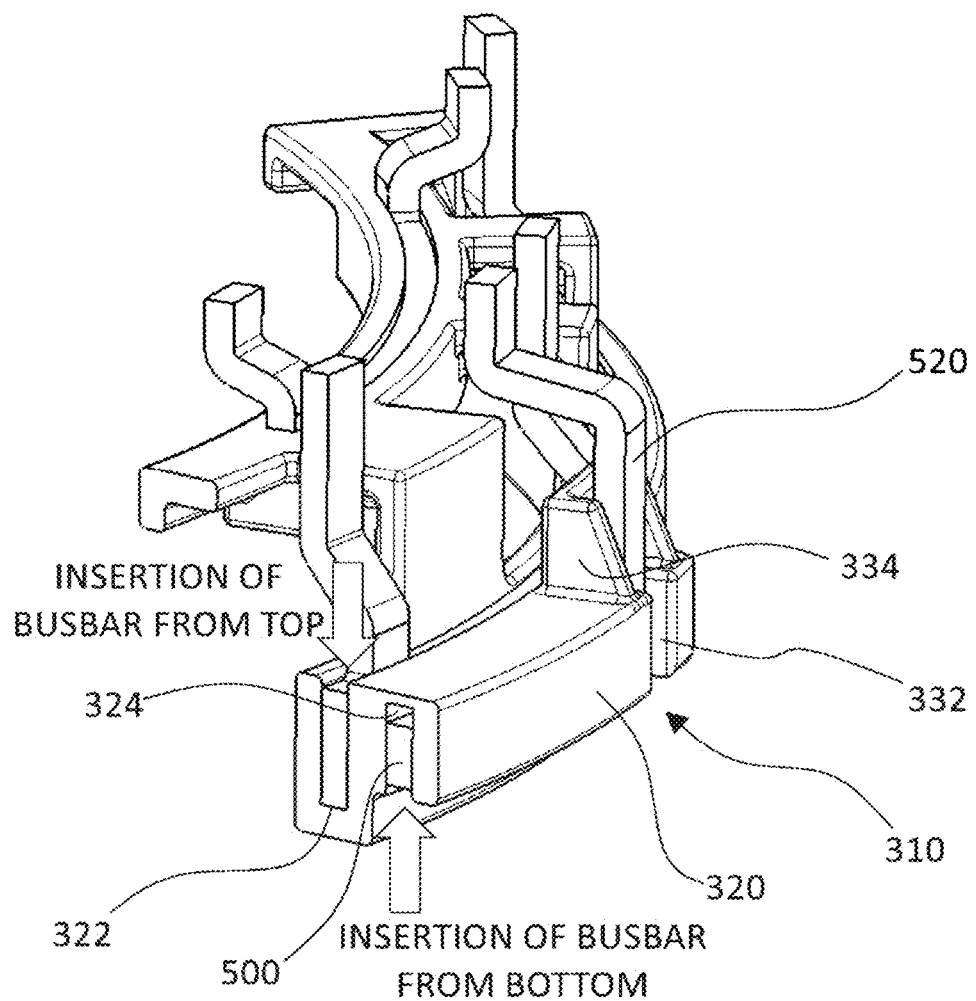
FIG. 4 is a side sectional view showing the terminal assembly for the driving motor according to the present disclosure.

Hereinafter, exemplary embodiments of the present disclosure are described in detail with reference to the accompanying drawings. FIG. 2 is a partially enlarged perspective view showing a terminal assembly for a driving motor according to an embodiment of the present disclosure, FIG. 3 is an perspective view showing main parts of the terminal assembly for the driving motor according to the present disclosure, and FIG. 4 is a side sectional view showing the terminal assembly for the driving motor according to the present disclosure.

Figure 1:
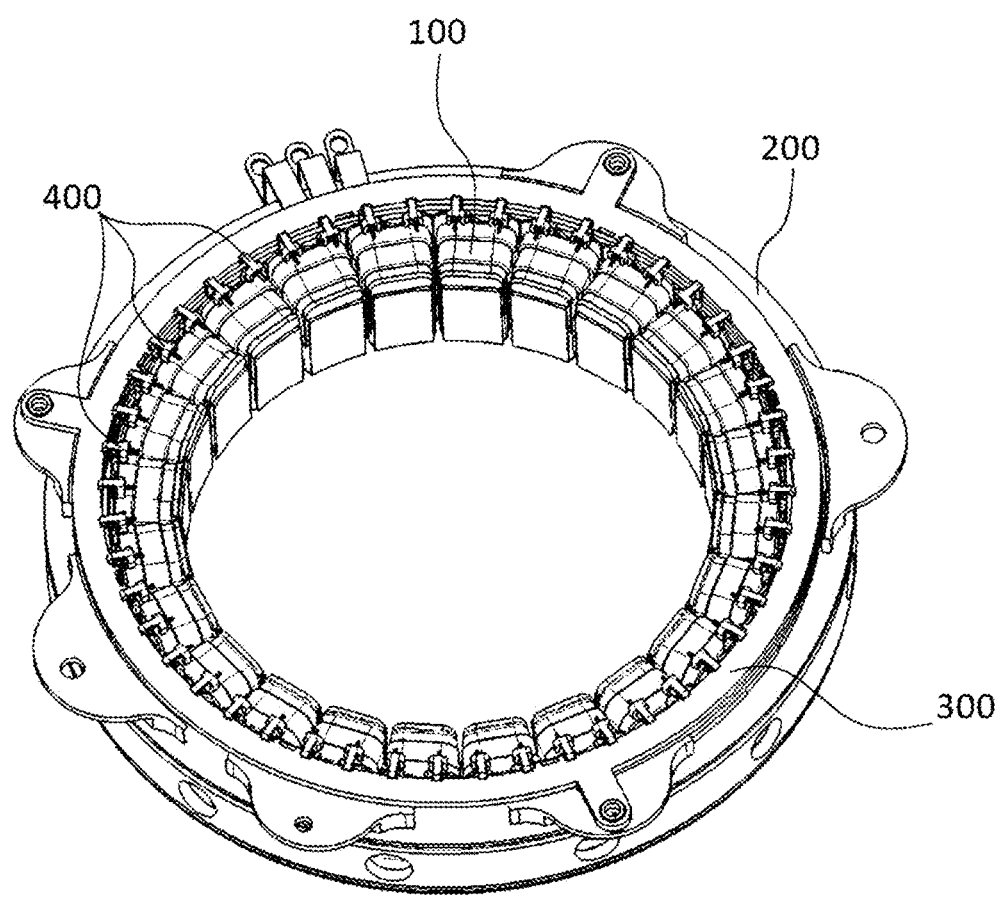
FIG. 1 is a perspective view showing a conventional driving motor.

First, as illustrated in FIG. 1, a driving motor includes a core bobbin assembly 100, a support ring 200 supporting the core bobbin assembly 100, and a terminal assembly 300 coupled to the support ring 200 to fix a coupling terminal 400.

Here, except for the terminal assembly 300, a well-known core bobbin assembly and support ring may be employed as the core bobbin assembly 100 and the support ring 200 illustrated in the drawings, and separate descriptions thereof will be omitted.

In addition, the present disclosure will be described with a focus on the terminal assembly 300 that differs from that used in the conventional art.

In other words, the present disclosure is characterized in that the terminal assembly 300 is capable of minimizing a distance between bus bars to avoid a creeping distance and minimizing a partition to improve cooling efficiency of the motor.

The terminal assembly 300 having the above features will be specifically described with reference to FIGS. 2 to 4.

The terminal assembly 300 has a body 310 formed in a circular shape in a plan view and formed in a stepped shape in a side sectional view.

In addition, the body 310 includes a bus bar fixing part 320, which is formed on an outer side thereof and allows a bus bar 500 to be fixed thereto, and a terminal guiding part 330 which is formed on an inner side thereof and partitions and guides terminals 520 of the bus bar 500.

That is, in the body 310, by changing shapes of the bus bar fixing part 320 and the terminal guiding part 330, both of which are integrally formed, a creeping distance may be avoided, a partition may be minimized, and the bus bar 500 may be easily coupled to the body.

An inner bus bar inserting groove 322 and an outer bus bar inserting groove 324 are formed in an inner portion and an outer portion of the bus bar fixing part 320, respectively.

In addition, insertion directions of the inner bus bar inserting groove 322 and the outer bus bar inserting groove 324 are formed to be opposite to each other.

Here, an example of a configuration of the bus bar fixing part 320 in which the bus bar 500 is coupled to the inner bus bar inserting groove 322 from top in a downward direction and the bus bar 500 is coupled to the outer bus bar inserting groove 324 from bottom in an upward direction will be described.

In other words, in order to allow a creeping distance between the adjacent bus bars 500 to be avoided as well as to allow a partition to be minimized when the bus bars 500 are coupled to the bus bar fixing part, the bus bar fixing part 320 has a configuration in which an insertion direction of the bus bar into the inner bus bar inserting groove 322 is opposite to an insertion direction of the bus bar into the outer bus bar inserting groove 324.

The terminal guiding part 330 is formed in a vertical direction in the middle of the outer bus bar inserting groove 324.

That is, the terminal guiding part 330 minimizes a conventional partition located between the adjacent bus bars 500.

Furthermore, the present disclosure may minimize a size of the partition, which obstructs direct cooling of a conventional hairpin coil, to a size of the terminal guiding part 330 to enhance cooling efficiency and may prevent performance of the motor from being degraded.

Also, the terminal guiding part 330 includes a terminal fixing section 332 supporting the terminal 520 of the bus bar 500 and a terminal receiving section 334 formed at an upper side of the terminal fixing section 332.

In other words, the terminal guiding part 330 guides and supports the terminal 520 of the bus bar 500, which is inserted from bottom in an upward direction, through the terminal fixing section 332 and the terminal receiving section 334.

In this case, the terminal receiving section 334 encloses an inner surface and both side surfaces of the terminal 520 constituting the bus bar 500 so that a creeping distance between the adjacent bus bars 500 may be avoided.

Hereinafter, an embodiment of the terminal assembly for the driving motor constructed as above will be described below.

First, the terminal assembly 300 having the body 310, which is formed in a circular shape in a plan view and formed in a stepped shape in a side sectional view, is formed.

The body 310 includes the bus bar fixing part 320 and the terminal guiding part 330 which are integrally formed, wherein the bus bar fixing part 320 has the inner bus bar inserting groove 322, which is formed in the inner portion thereof and allows the bus bar 500 to be coupled thereto from top in a downward direction, and the outer bus bar inserting groove 324 which is formed in the outer portion thereof and configured to allow the bus bar 500 to be coupled thereto from bottom in an upward direction, and the terminal guiding part 330 has the terminal fixing section 332 supporting the terminal 520 of the bus bar 500 in a vertical direction in the middle of the outer bus bar inserting groove 324 and the terminal receiving section 334 formed on an upper portion of the terminal fixing section 332.

In addition, the core bobbin assembly 100, to which a core around which a coil is already wound in a circumferential direction is mounted, is formed, and the core bobbin assembly 100 is then mounted in the hollow support ring 200.

When the terminal assembly 300 is coupled to upper portions of the core bobbin assembly 100 and the support ring 200, an assembling process of the driving motor including the terminal assembly is completed.

The terminal assembly for the driving according to the present disclosure does not use an overmolding process so as to simplify a manufacturing process. It can minimize a distance between the bus bars, and can simultaneously avoid a creeping distance. Further it can minimize a partition, which obstructs cooling of a coil, so as to enhance cooling efficiency of the motor, and also prevent a dielectric breakdown due to discharge even though contamination is present inside the motor.

The foregoing description only describes the technical spirit of the present disclosure exemplarily, and those skilled in the art to which the present disclosure pertains may variously modify and change the present disclosure without departing from the essential characteristics of the disclosure.

Therefore, the embodiments disclosed in the present disclosure are intended to describe rather than limit the technical spirit of the present disclosure, and the scope of the present disclosure is not limited by the above embodiments. The scope of protection of the present disclosure should be construed according to the following claims, and all technical spirits which are equivalent thereto or within the scope of equivalents thereof should be interpreted as being included in the scope of the present disclosure.

What is claimed is:

1. A terminal assembly for a driving motor, which is provided in a driving motor including a core bobbin assembly, to which a core around which a coil is wound in a circumferential direction is mounted, a support ring which supports an outside of the core bobbin assembly, and a terminal assembly coupled to an upper portion of the support ring to fix a coupling terminal, the terminal assembly for a driving motor comprising:
   a body formed in a circular shape in a plan view and formed in a stepped shape in a side sectional view,
   wherein the body comprises a bus bar fixing part, which is formed on an outer side thereof and allows a bus bar to be fixed thereto, and a terminal guiding part which is formed on an inner side thereof and partitions and guides terminals of the bus bar.

2. The terminal assembly for a driving motor of claim 1, wherein:
   the bus bar fixing part has an inner bus bar inserting groove and an outer bus bar inserting groove formed in an inner portion and an outer portion thereof, respectively; and
   insertion directions of the inner bus bar inserting groove and the outer bus bar inserting groove are formed to be opposite to each other.

3. The terminal assembly for a driving motor of claim 2, wherein:
   the bus bar is coupled to the inner bus bar inserting groove from top in a downward direction; and
   the bus bar is coupled to the outer bus bar inserting groove from bottom in an upward direction.

4. The terminal assembly for a driving motor of claim 2, wherein the outer bus bar inserting groove has a terminal guiding part formed in a middle thereof in a vertical direction.

5. The terminal assembly for a driving motor of claim 4, wherein the terminal guiding part comprises a terminal fixing section configured to support the terminal of the bus bar and a terminal receiving section formed at an upper side of the terminal fixing section.

6. The terminal assembly for a driving motor of claim 5, wherein the terminal receiving section encloses an inner surface and both side surfaces of the terminal.

* * * * *